May 28, 1929.  J. S. STULL  1,714,700
ROTARY TOOL
Filed Oct. 9, 1926
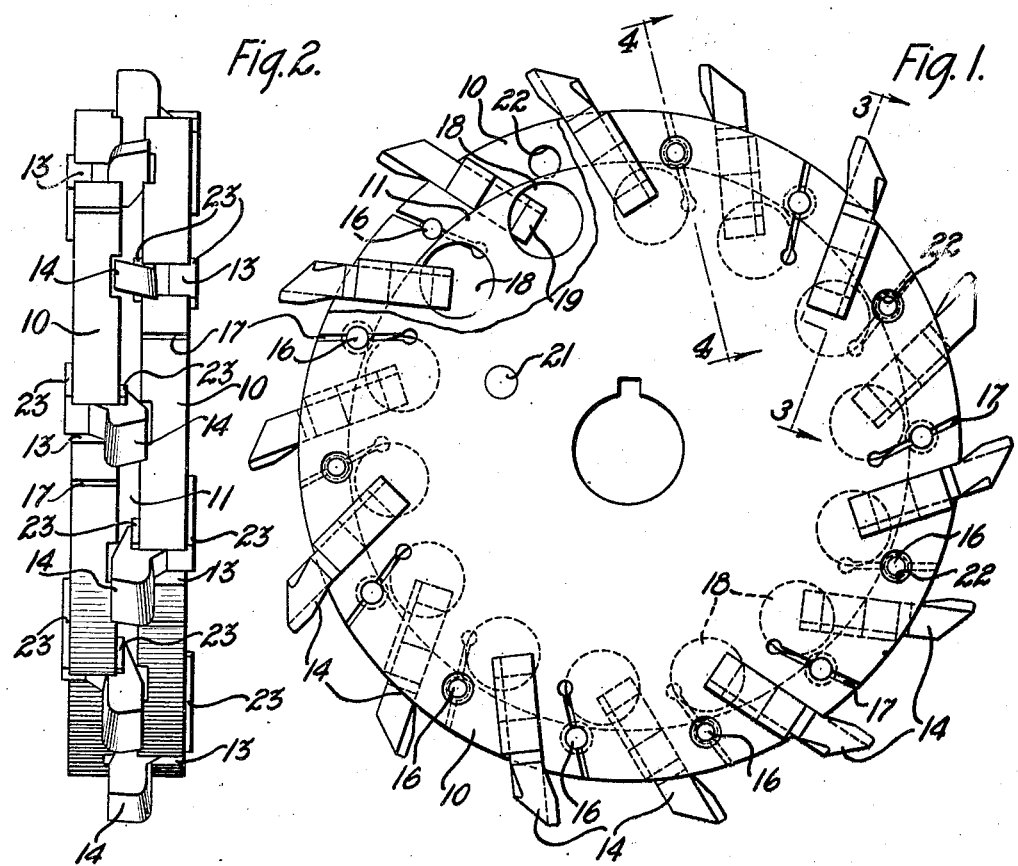
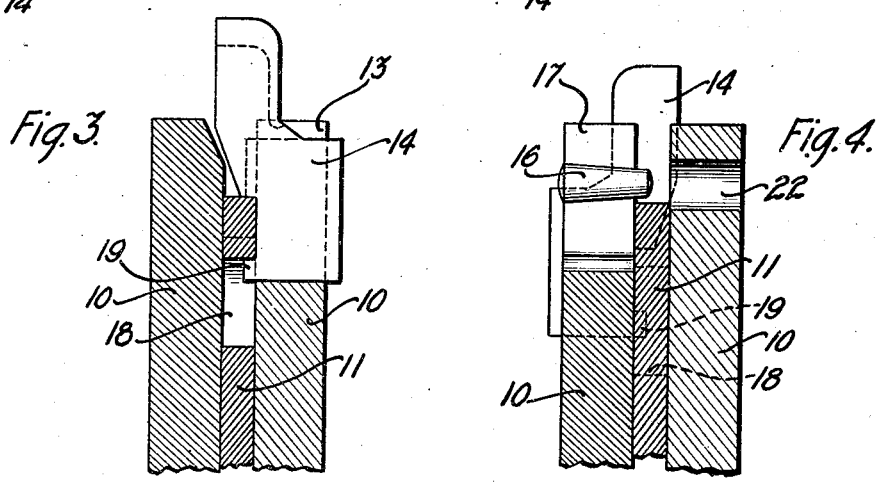
Inventor
John S. Stull
by [signature] Att'y.

Patented May 28, 1929.

1,714,700

UNITED STATES PATENT OFFICE.

JOHN STANLEY STULL, OF CHICAGO, ILLINOIS, ASSIGNOR TO WESTERN ELECTRIC COMPANY, INCORPORATED, OF NEW YORK, N. Y., A CORPORATION OF NEW YORK.

ROTARY TOOL.

Application filed October 9, 1926. Serial No. 140,445.

This invention relates to rotary tools, and more particularly to inserted tooth milling cutters.

The primary object of this invention is to provide a rotary tool having means for positively preventing the displacement of an inserted working element during the rotation thereof.

In accordance with the general features thereof, one embodiment of the invention contemplates the provision of an inserted tooth milling cutter comprising two companion body portions and an apertured plate or disk clamped therebetween. A plurality of cutter teeth or blades are inserted within peripheral recesses of the cutter body and a lateral projection or shoulder formed on each of the cutter teeth extends within companion apertures in the disk. These projections by engaging the disk positively prevent the outward displacement of the cutter teeth by the action of centrifugal force occasioned during rotation.

These and other objects will be more apparent from the following detailed description and the accompanying drawing, wherein—

Fig. 1 is an elevational view of an inserted tooth milling cutter representative of one embodiment of the invention;

Fig. 2 is an elevational view of the cutter as viewed from the left in Fig. 1;

Fig. 3 is a fragmentary detailed sectional view taken on the line 3—3 of Fig. 1, and Fig. 4 is a similar sectional view taken on the line 4—4 of Fig. 1.

Referring now to the drawings wherein like numerals have been employed to designate similar parts throughout the various figures, it will be observed that one embodiment of the invention comprises a cutter body which includes a pair of companion cylindrical members 10 adapted to be mounted upon a conventional milling machine arbor (not shown). Interposed between the adjacent lateral surfaces of the cylindrical members 10 is a circular plate or disk 11 and it will be understood that when the members 10 and disk 11 are secured upon a milling machine arbor, the disk 11 will be clamped in position between the members 10. Each of the cylindrical members 10 is provided with a plurality of recesses 13 extending transversely thereof, the positions of the recesses in one member being staggered with respect to the recesses in the other member. A suitable cutter tooth 14 is inserted within each of the recesses and tapered pins 16 which are driven within peripheral slots 17 formed at spaced intervals in each of the cylindrical members 10 cause the portions on each side of the slot to effectively clamp the inserted teeth within their respective recesses.

The circular plate or disk 11 is formed with a plurality of marginally positioned apertures 18, each of these apertures being designed to receive a lateral projection or shoulder 19 formed at the lower extremity of each of the teeth 14. A locking pin 21 (Fig. 1) extending through the cylindrical member 10 and the disk 11 serves to maintain the proper relative positions of the disk and the cylindrical members. To facilitate the removal of the tapered pins 16, apertures 22 are provided in the members 10 which permit the insertion of a suitable tool to dislodge the tapered pins.

From the foregoing it will be clear that when the cutter parts are completely assembled the engagement of the projections 19 with the walls of their companion apertures into which they extend will positively preclude the possibility of any outward displacement of the teeth 14. Should any of the tapered pins 16 become dislodged during the operation of the cutter, outward displacement of the teeth will be prevented by means of the engagement of the projection 19 as above stated and lateral displacement thereof is prevented by means of guides 23 formed on each side of the lower portions of the teeth 14 which engage the sides of the body members 10. These guides 23 serve to properly position the teeth 14 during the insertion thereof within their respective recesses in cylindrical body members.

To properly assemble the various parts comprising the milling cutter the teeth 14 are first inserted within their respective slots 13, the guides 23 in this instance guiding the inserted teeth into proper position. The tapered pins 16 are then driven in position to securely clamp the teeth within the members 10. The disk 11 is then interposed between the members 10 with each of the projections 19 of the teeth 14 extending within one of the apertures 18 and when the disk and members are in proper juxtaposition the locking pin 21 may be inserted. The members 10 are clamped in position against the adjacent surfaces of the disk 11 in the manner which is conventionally employed in mounting rotary cutters on milling machine arbors and the cutter is then completely assembled and ready for use.

By having a rotary cutter constructed in the manner described the dangers incident to the operation of inserted tooth cutters, particularly when operating under high speeds, are materially decreased by reason of the fact that the inserted teeth are positively secured against outward displacement due to centrifugal force occasioned during rotation. The positive prevention of the outward displacement of the teeth insures the proper, uniform alignment thereof within the cutter body and thereby renders the cutter adaptable for producing very uniform and accurate working cuts.

Although the invention has been described in connection with a particular type of inserted tooth milling cutter, it will be understood that the invention is capable of application to many other types of tools having inserted working elements and is limited only by the scope of the appended claims.

What is claimed is:

1. In a rotary cutter, a cutter body comprising a pair of oppositely disposed cylindrical members having a plurality of transverse peripheral recesses, a cutting element carried within each of the recesses and extending outwardly from the body, the portions of the cutting elements within the recesses having a lateral projection, and a disk interposed between the cylindrical body members to receive the projections and secure the cutting elements against outward displacement.

2. In a rotary cutter, a cutter body comprising a pair of oppositely disposed cylindrical members having recesses traversing the peripheries thereof, a cutting element carried within each recess and extending outwardly from the body, each of the cutting elements being formed with a guide for engaging a body member and having a lateral projection, and a disk interposed between the members and having a plurality of apertures to receive the projections and secure the cutting elements against outward displacement.

3. In a rotary cutter, a pair of disks having peripheral recesses therein, cutting elements carried in the recesses and having transverse projections, and a third disk interposed between the recessed disks and having apertures therein corresponding in number to the cutting elements for receiving the projections of and thereby securing the cutting elements against outward displacement, the projections of adjacent cutting elements entering the apertures from opposite sides of the interposed disk.

4. In a rotary cutter, a pair of disks having peripheral recesses therein, the recesses of one disk being arranged alternately with respect to the recesses of the other disk, a third disk interposed between the recessed disks and having a plurality of apertures therein corresponding in number to the total number of recesses in the two recessed disks, and cutting elements carried in the recesses, extending outwardly from the peripheries of the disks and having projections extending into the apertures in the interposed disk to secure the cutting elements against outward displacement, the projections of alternate cutting elements entering the apertures from opposite sides of the interposed disk.

5. In a rotary tool, a body consisting of a plurality of cylindrical members each having a peripheral recess, a disc between the cylindrical members and having an aperture located in spaced relation to the recess, and a cutting element engaged in the recess and having a lateral projection engaging the aperture.

In witness whereof, I hereunto subscribe my name this 24 day of September A. D. 1926.

JOHN STANLEY STULL.